United States Patent
Benz et al.

(10) Patent No.: US 6,692,824 B2
(45) Date of Patent: *Feb. 17, 2004

(54) INFRARED-REFLECTING BODIES

(75) Inventors: Volker Benz, Höchst (DE); Wolfgang Scharnke, Darmstadt (DE); Michael Meier-Kaiser, Pfungstadt (DE); Michael Müller, Bensheim (DE)

(73) Assignee: Roehm GmbH & Co. KG, Darmstadt (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/329,075

(22) Filed: Oct. 25, 1994

(65) Prior Publication Data

US 2003/0091814 A1 May 15, 2003

Related U.S. Application Data

(63) Continuation of application No. 07/994,307, filed on Dec. 21, 1992, now abandoned.

(30) Foreign Application Priority Data

Dec. 21, 1991 (DE) .......................... 41 42 542

(51) Int. Cl.⁷ .................. B32B 5/02; B32B 27/18; B32B 27/20; B32B 27/30
(52) U.S. Cl. .................. 428/328; 428/323; 428/324; 428/325; 428/331; 428/332; 428/335; 428/339; 428/363; 428/403; 428/404; 428/421; 428/500; 428/515; 428/520; 428/522; 428/910; 428/918
(58) Field of Search ............... 428/324, 323, 428/294, 364, 363, 918, 328, 910, 325, 331, 332, 335, 334, 339, 403, 404, 421, 500, 515, 520, 522; 264/437

(56) References Cited

U.S. PATENT DOCUMENTS

| | | | | |
|---|---|---|---|---|
| 3,087,828 A | * | 4/1963 | Linton | 106/291 |
| 4,090,773 A | * | 5/1978 | Bauer et al. | 350/1.6 |
| 4,668,588 A | * | 5/1987 | Kishima | 428/412 |
| 4,730,020 A | * | 3/1988 | Wilfinger et al. | 524/555 |
| 4,871,588 A | * | 10/1989 | Cuddy et al. | 427/264 |
| 4,916,014 A | * | 4/1990 | Weber et al. | 428/403 |
| 5,114,789 A | * | 5/1992 | Reafler | 428/328 |
| 5,215,811 A | * | 6/1993 | Reafler et al. | 428/212 |

FOREIGN PATENT DOCUMENTS

| | | |
|---|---|---|
| DE | 25 44 245 B2 | 4/1977 |
| EP | 0 340 313 A | 11/1989 |
| EP | 0 428 937 A1 * | 5/1991 |
| EP | 0548 822 B1 | 6/1993 |

OTHER PUBLICATIONS

GE Electrics, Netherlands two drafted opinions (Hoying and Eggert).
Merck prospects "Iriodin for plastics".

* cited by examiner

Primary Examiner—Vivian Chen
(74) Attorney, Agent, or Firm—Oblon, Spivak, McClelland, Maier & Neustadt, P.C.

(57) ABSTRACT

A light-permeable, IR-reflecting body which contains a stiff, amorphous base material comprised of light-permeable plastic and IR-reflecting particles which are oriented parallel to the surface, said light-permeable IR-reflecting body having a transmissivity (T) in the visible range of 45–75%, an overall energy permeability (g) of 30–60%, and a T/g ratio of >1.15, and the IR-reflecting particles oriented parallel to the surface are disposed in a coating layer comprised of a transparent water-insoluble binder, which layer is 5–40 micron thick and adheres to the base material, wherewith red-reflecting particles with a layer of titanium dioxide 60–120 nm thick on a platelet-shaped carrier pigment are present in the aforesaid coating layer in the amount of 20–40 wt. % of said coating layer.

15 Claims, No Drawings

INFRARED-REFLECTING BODIES

This is a Continuation, of application Ser. No. 07/994,307 filed on Dec. 21, 1992 ABAN.

BACKGROUND OF THE INVENTION

1. Field of the Invention

The present invention relates to a light-permeable, light-scattering, IR-reflecting body with a whitish appearance which contains a base material with high light-permeability and further contains particles which reflect IR and are disposed parallel to the surface of the sheet. The invention also relates to the use of such a body as a thermally insulating and sunlight-protecting roofing material.

2. Description of the Background

Ger. Pat. 2,544,245 discloses a sheet of the above-described type, comprised of polymethyl methacrylate (PMMA) having a quantity of light-reflecting particles oriented parallel to the surface. The particles have a thickness chosen such that they transmit most of the incident visible light but reflect most of the incident IR radiation.

The known body contains the light-reflecting particles in the base material comprised of PMMA. They are introduced into the liquid methyl methacrylate monomer which is then charged to a polymerization chamber formed from parallel glass plates and is partially polymerized. Up to this point the particles have sunk to the lower glass plate. The plates are shifted in a mutually parallel fashion, whereby the particles are oriented parallel to the surface and are maintained in this position while the polymerization is continued. This treatment step renders the manufacturing process costly in terms of resources and economics.

Eur. OS 340,313 describes sunlight-protective coatings for ships, fluid tanks, buildings, and the like, which are intended to reduce heating in sunlight. The coatings contain a binder, a heat-reflecting pigment, and possible coloring pigments where desired.

According to Eur. OS 428,937, polyethylene sheets for greenhouses can be produced by treating the basic material with a brushed (or similarly spread on) or sprayed coating containing light-reflecting pigments in a matrix comprising a paint binder. Because the application process does not orient the pigment particles, they have only a shading action, and do not transmit to a satisfactory degree. Because ordinary paint binders do not adhere well to polyethylene, the coating can be easily removed from the coated sheet with a stream of water. A need therefore continues to exist for a light permeable weather resistant body which possesses high IR reflection.

SUMMARY OF THE INVENTION

Accordingly, one object of the present invention is to provide weather-resistant IR-reflecting bodies which have high light permeability and which can be easily manufactured. In particular, high IR reflection must be combined with maximal transmissivity (T) in the visible 380–780 nm range, only limited overall energy permeability (g), and a selectivity index, expressed by the ratio T/g, of >1.15.

Briefly, this object and other objects of the invention as hereinafter will become more readily apparent can be attained in a light-permeable IR-reflecting body comprised of a stiff amorphous base material comprised of light-permeable plastic and IR-reflecting particles oriented parallel to the surface, the light-permeable IR-reflecting body having a transmissivity (T) in the visible range of 45–75%, an overall energy permeability (g) of 30–60%, and a T/g ratio of >1.15. The IR-reflecting particles oriented parallel to the surface are disposed in a coating layer comprised of a transparent water-insoluble binder, which layer is 5–40 micron thick and adheres to the base material. Red-reflecting particles with a layer of titanium dioxide 60–120 nm thick on a platelet-shaped carrier pigment are present in the aforesaid coating layer in the amount of 20–40 wt. % of the coating layer.

DETAILED DESCRIPTION OF THE PREFERRED EMBODIMENTS

The amount of visible light which passes through the body of the present invention in relation to the total energy permeability can be increased by a critical adjustment of the thickness of the coating layer, by the content of IR-reflecting particles in the coating layer, and by the size distribution of the particles. This adjustment is expressed in the claimed values of T, g, and T/g.

If the coating thickness or the pigment content is increased, T is decreased. If the coating thickness or the pigment content is decreased, g is decreased undesirably. If the pigment particles are too small or too large, T/g decreases. This is attributable to light refraction and light scattering effects, and to the susceptibility of larger pigment particles to breakage during handling or processing, wherewith the resulting small particles cause an unfavorable T/g ratio. Only in the narrow range of parameters of the present invention has it been possible to achieve high permeability to visible light in combination with relatively low IR-permeability.

An additional advantage of the present invention is in the category of easy manufacturability. The known method of producing IR-reflecting sheets having high light-permeability is suffering from the disadvantage that the production of the base body by a special polymerization method is encompassing the production of the IR-reflecting structure. Thus, in order to produce differently sized bodies the whole production method had to be varied accordingly. In contrast, the IR-reflecting sheets of the invention may be produced starting from any available light-permeable base body and requiring only conventional coating methods to produce a wide variety of differently sized IR-reflecting bodies. In particular, possible methods include the following:

A previously manufactured light-permeable body is coated by means of paint technology with a coating suitable for forming the coating layer.

Light-permeable PMMA or polycarbonate plastics are co-extruded with a coating material.

The reflecting structure is produced here also by a shear treatment of the still-liquid coating, which coating is not subjected to additional processes but arises in the necessary manner in the course of suitable coating and co-extrusion operations.

According to the invention, light-permeable bodies of any arbitrary shape may be rendered IR-reflecting, and not merely "cast" sheets of PMMA produced by polymerization in sheet-shaped chambers. In this way, products economically produced by extrusion, such as extruded sheets or double skin sheets, can be rendered IR-reflecting.

The production of the IR-reflecting orientation by parallel displacement of the narrow-chamber walls is a method which is more difficult and can be accomplished only with special equipment. Because the polymerizing base material is liquid over its entire thickness, major shear displacement is required in order to orient the IR-reflecting particles. In contrast, the coating layer in the manufacture of the present bodies can be kept very thin, so that a substantial orienting effect can be obtained from a minor shear displacement. The possibilities for shear displacement are numerous and may be optimally adapted to the particular characteristics of the body which is to be coated and the production method which is to be used. Thus, e.g., a coating zone and a shearing zone may be readily provided in an extrusion line, by simple means. Accordingly, the apparatus cost is substantially reduced and the IR-reflecting bodies can be supplied at competitive prices.

The high light-permeability of the present bodies makes them suitable as, e.g., durable roofing materials, particularly for greenhouses. By means of the present invention it is not necessary to provide for the temporary removal of the coating to enable more intense light penetration.

Light-permeability and IR-reflection Properties:

The term "light-permeable" concerns the visible region of the spectrum, for which the wavelength range 380–780 nm is used for characterization, particularly 550 nm. The light permeability, here designated (T), is generally symbolized as $\tau_{D65}$ in the scientific literature. The base material and the binder material should have light permeability (T)=at least 50%, preferably 60–94%. It is advantageous if they are substantially transparent. As used in connection with the invention, the IR spectral region is the heat radiation band with wavelengths 700–2000 nm.

The quality of the coating layer is expressed by the quotient T/g, which is also called the "selectivity parameter" (SKZ) (according to DIN 67 507). It is the quotient of the percent of light transmissivity in the visible range and the percent of overall permeability to radiated energy.

The T/g value is a measure of the IR reflection and thus also for the effectiveness of sun protection panels; thus it should be as high as possible. For uncoated PMMA sheet, T/g=1.0. For gold vapor coated mineral glass sheet, a T/g value of 1.2–1.3 is attained; as is the value for sheets of Ger. OS 25 44 245. For a sheet coated on one side according to the present invention, T/g values of up to 1.40 are obtained.

A typical transmission/reflection curve for a material according to the invention with a layer thickness of 15 micron (according to Example 1) is shown in FIG. 1. Here Rb represents the reflection curve on the coated side; Ru represents the reflection curve on the uncoated side; Tb represents the transmission curve on the coated side; and Tu represents the transmission curve on the uncoated side.

It is surprising that a higher selectivity parameter is achieved with the present coating layer than with the sheets produced according to Ger. Pat. 2,544,245 wherein the reflecting pigment is distributed in the mass. In comparison thereto the pigment particles are packed more tightly in radiation-reflecting coatings. Corresponding to the stated object of Eur. OS 340,313, which is to repel the solar radiation to the maximum extent, the expected selectivity parameter would be much lower.

The Light-permeable Body:

This contains a stiff, light-permeable base material comprised of plastic, e.g. in the form of a planar sheet or plate, a double skin sheet, or a light-admitting sky dome. Suitable plastics include, e.g., polystyrene and styrene-acrylonitrile copolymers. Preferred plastics are PMMAs and polycarbonates. PMMAs are here understood to mean stiff amorphous plastics which are comprised of units of methyl methacrylate to the extent of at least 60 wt. %, preferably at least 80 wt. %. Polycarbonate plastics are principally aromatic polycarbonates of bisphenols, e.g. of bisphenol A. Permeability to IR radiation is not an essential requirement for the base material, because even if the base material absorbs IR, the reflection may be desirable to avoid harmful overheating from IR radiation.

The thickness of the base material is not crucial for the purposes of the invention. As a rule, the thickness is 1–50 mm, preferably 1–10 mm.

The IR-reflecting coating layer is as a rule disposed on the surface of the body. In normal applications the layer is on the side of the body directed away from the weather exposure. If desired, both sides may be coated.

The IR-reflecting Particles:

IR-reflecting particles are known, e.g. as so-called "pearl lustre pigments". They have the shape of platelets or the like. For the purposes of the invention, red-reflecting pearl lustre pigments are used, e.g. IRIODIN® 219 (supplied by E. Merck of Darmstadt). Preferably they are comprised of coated platelets of mineral material, usually mica, with a thickness of 200–2000 nm, preferably 300–600 nm; a diameter of 5–100 micron, preferably 20–60 micron, and a mean diameter of 20–70 micron, preferably 20–25 micron.

Physically the IR reflection is based on double reflection of the light on the upper and lower sides of the particles, with the particles being disposed parallel to the surface. Depending on the thickness of the particle and the wavelength of the incident light, the radiation reflected on the upper and lower sides of the particle may be intensified or extinguished, by interference. Intensification of the reflected radiation occurs when $$d=(2x-1) L_r/4n,$$

where d is the thickness of the particle, x=1, $L_r$ is the wavelength of the reflected radiation, and n is the index of refraction of the particle at this wavelength.

Extinction or attenuation of the reflected light occurs when $$d=(x-1) L_t/2n,$$

where here x=2, and $L_t$ is the wavelength of the light (which here is not reflected but is passed).

By combining the two equations, $$L_t=2L_r.$$

Thus for a given layer thickness d, light of wavelength $L_r$ undergoes the strongest reflection and light of wavelength 0.5 $L_r=L_t$ is passed to the maximum extent. According to the invention, the thickness of the particles is chosen such that the light passed by them is in the visible range and the light most strongly reflected by them is in the IR range. Because red visible light is reflected to some extent, very suitable particles for the present invention are red-reflecting particles.

Although various pigments are known which have the specified relationship of thickness and index of refraction, e.g. titanium dioxide (particularly of the anatase type), basic lead carbonate, or bismuth oxychloride, only titanium dioxide precipitated onto a platelet-shaped support pigment satisfies the several requirements applied to the pearl lustre pigment according to the invention. Particularly advantageous is titanium dioxide which is precipitated onto mica particles or similar platelet-shaped mineral materials in a defined layer thickness. The layer thickness d refers only to the $TiO_2$ layer, not the mica substrate. This pigment provides light-scattering coatings which are particularly well suited for all types of roof paneling, skylights, and the like.

The effectiveness of the IR-reflecting particles depends on their being oriented parallel to the surface of the sheet, and on the pigment content of the coating layer. A pigment content of 20–40 wt. %, particularly 25–30 wt. %, is critical in order to achieve the effect of the invention. Preferably the amount is chosen such that a transmissivity of 45–75% is achieved at a wavelength of 380–780 nm (or 550 nm), along with a total energy permeability of 30–60%. Preferably the IR reflectivity at wavelength 1000 nm is at least 40%.

Because the only particles which provide effective reflection are those which are oriented parallel to the surface of the sheet, it is desirable to provide such parallel orientation to the maximum possible degree. The orientation is brought about by shear displacement of the coating agent in the still liquid coating layer. When coating with pigmented coatings using paint technology, it is often sufficient to use customary coating methods, e.g. doctoring, to achieve the orientation. The "reverse roll coating" method is very effective, wherein the coating agent is distributed with a roll above the surface of the sheet, which roll is rotating counter to the direction of advance. The thickness of the dried layer may be, e.g., 5–40 micron.

A particularly advantageous production method comprises extrusion, which yields a surprisingly good orientation of the light-reflecting particles parallel to the surface, and does not require a separate processing step for the coating.

The Binder:

The coating layer contains the light-reflecting particles in a light-permeable adhesive binder. The adhesion should be so high that the coating does not separate from the substrate when the body is bent in a cold state or a thermoelastically heated state. The selection of binders by the criterion of adhesion to the substrate to be coated is well known to one skilled in the art. In principle, all of the customary water-insoluble binders for pigments may be used, and the coating methods may be any suitable methods of application. Preferred are hydrophobic binders which do not swell in contact with water. Suitable light-permeable binders are, e.g., polymers of (meth)acrylate esters, polycarbonates, polyurethane resins, polyester resins, polystyrene, or polyvinyl chloride. In the individual case the choice will depend on the requirements of the coating method and the properties needed for the intended use.

Binders based on poly(meth)acrylate plastics are particularly suitable, from the standpoints of good adhesion to numerous plastics, high weather resistance, high resistance to yellowing, and good aging properties. Binders which are thermoplastic or at least thermoelastic provide the advantage that they can undergo bending or stretching deformation along with the coated plastic body, without detriment to the IR-reflecting effect. Linear stretching in excess of 10%, possibly >50%, is possible. This applies to physically drying, essentially un-crosslinked binders. Binders which harden by or with crosslinking, such as alkyd resins or reactive resins based on multifunctional acrylic esters, are suitable if sufficiently adhesive and if the coating layer is not subjected to deformation.

It has proved advantageous for the content of the pure binder in the IR-reflecting coating to be 60–80 wt. %.

In coating using paint technology, the coating layer is produced from a liquid coating agent which contains
- a vehicle liquid for the binder, in addition to
- the binder itself and
- the IR-reflecting particles.

The vehicle may be any of the usual paint solvents, such as esters, alcohols, ethers, ketones, aromatics, chlorinated hydrocarbons, or mixtures of these. In the case of reactive resins, the multifunctional acrylate esters assume the vehicle function. The amount of the vehicle depends on the processing method; it may comprise, e.g., 30–85 wt. % of the coating agent.

The binder may also be present in the coating agent in dispersed form, preferably in the form of an aqueous dispersion of a plastic. It may have so-called flowability agents, as is common in painting technology. Flowability agents are understood to be organic solvents or swelling agents for the dispersed plastic, which agents are usually high boiling; e.g., methoxy-2-propanol or butyl glycol acetate, which temporarily plasticize the binder and are evaporated during or after the drying process. Also, water-soluble thickeners improve the flow characteristics during application. Instead of dispersions of the binder in aqueous medium, it is possible to use dispersions in organic liquids.

If the coating is applied from a liquid coating agent onto the surface of the solid substrate, it is recommended that the coated surface of the substrate be that which, when the body is in use, is on the side directed away from the weathering.

If the coating layer is formed in the course of co-extrusion, there is no need for a vehicle liquid. In this case the coating may be on the side of the substrate facing the weathering. A relatively thick main layer of light-permeable thermoplastic plastic is co-extruded, as the base material, with a relatively thin layer of the transparent binder containing the IR-reflecting particles, which binder may otherwise be the same as the base material. The IR-reflecting particles are oriented to a sufficient degree during the flow of the coating layer through the co-extrusion, die.

In the co-extrusion, care should be taken to ensure that the platelet-shaped pearl lustre pigment is broken up to the minimum extent possible, because the effect of comminution of the pigment is to reduce the selectivity of the coating. It has proven advantageous to adjust the melt viscosity of the pigmented material for forming the IR-reflecting layer to be less than that of the base material. Preferably the melt viscosities have a ratio in the range 2:1 to 1.5:1, at the processing temperature. It is also advantageous if the pearl lustre pigment is introduced into the already melted binder. This can be accomplished with a powder dosing screw which uniformly feeds the pigment into the intake zone of a two-screw kneader apparatus with tightly mating screws. The resulting pigmented melt flow is then co-conveyed with the melt of the base material, in a co-extrusion adapter, to form a multilayer extrudate, and is broadened in a customary distribution channel to produce the desired sheet width.

The Organosilane:

The effectiveness of the IR-reflecting particles is improved by the addition of an organosilane. It is assumed that the organosilane has a dispersing effect which counteracts the tendency of the IR-reflecting particles to agglomerate. This promotes orientability of the particles to form a layer parallel to the sheet surface which layer covers the surface in the manner of flakes or fish scales.

Because organosilanes tend to hydrolyze, they are suited as additives to non-aqueous coating agents. Organosilanes may be described by the general formula $$R_n\text{—Si—}(OR')_m,$$

where

R and R' represent organic groups, and n+m=4.

Preferably R and R' each contain 1–8 C atoms. Preferred are alkyl groups, alkenyl groups, aralkyl groups, haloalkyl groups, alkoxyalkyl groups, aminoalkyl groups and acyl groups, as well as organic groups with oxirane groups. Important factors for the dispersant effect of the organosilanes are its affinity not only to the IR-reflecting particles but also to the binder. The organosilane is preferably dissolved in the coating composition.

Among the usable organosilanes are the following: methyl trimethoxysilane, methyl triethoxysilane, ethyl trimethoxysilane, vinyl triethoxysilane, vinyl triacetoxysilane, vinyl tri(methoxyethoxy)silane, chloropropyl trimethoxysilane, phenyl triethoxysilane, dimethyl dimethoxysilane, methacryloxypropyl trimethoxysilane, methacryloxypropyl methyl dimethoxysilane, glycidoxypropyl trimethoxysilane, glycidoxyethyl methyl dimethoxysilane, and 3,4-epoxycyclohexylethyl trimethoxysilane.

The organosilane is preferably employed in an amount of 1–25 wt. %, particularly preferably 1–10 wt. % (based on the weight of the IR-reflecting particles).

Having generally described this invention, a further understanding can be obtained by reference to certain specific examples which are provided herein for purposes of illustration only and are not intended to be limiting unless otherwise specified.

EXAMPLES

1. Coating of Acrylic Glass Substitute with a Coating, Using Paint Technology

A 3 mm thick sheet of acrylic glass substitute (PMMA) of size 300×300 mm was coated with the following coating on one side, using a roll coater:

(i) 12 parts by weight (pbw) of a pearl lustre pigment comprised of coated particles of mica of size 20–100 micron, with the coating comprising a 90 nm thick layer of rutile titanium dioxide (trade name IRIODIN® 219, supplied by Merck);

(ii) 18 pbw of a pearl polymer of methyl methacrylate and butyl acrylate, with solution viscosity at 25° C. in chloroform: 40–50 ml/g (trade name PLEXIGUM® M 890, supplied by Roehm GmbH);

(iii) 0.24 pbw chloropropyl trimethoxysilane; and (iv) 70 pbw methoxy-2-propanol.

The coating film was applied with a "reverse roll", in a thickness of 30–40 micron, producing the characteristic luster of a pearl lustre pigment which luster is an indication of the orientation of the IR-reflecting particles. The coating was dried and had a thickness of 10 micron. It contained 40 wt. % pigment (13 g/sq m). When illuminated it had a whitish appearance with a reddish luster. The light which it passed was a light green color.

Three additional coatings of 7, 8, and 13 micron thick were produced in similar fashion. From measurements of the transmissivity (T) and the reflection (R) at 1000 nm, the overall energy permeability (g) and the selectivity parameter T/g were determined for the coated side:

| Coating thickness (micron) | T (%) | g (%) | T/g |
|---|---|---|---|
| 7 | 66.7 | 54 | 1.24 |
| 8 | 63.2 | 50.6 | 1.25 |
| 10 | 58.3 | 47 | 1.24 |
| 13 | 54.6 | 43.2 | 1.26 |

For comparison, various commercially available pearl lustre pigments with various thicknesses of the TiO$_2$ layer were used with coatings 10 micron thick. The optical behavior is seen from the following Table:

| TiO$_2$ (nm) | Reflection color | IRIODIN® type | T (%) | g (%) | T/g |
|---|---|---|---|---|---|
| 90 | red | 219 | 58.3 | 47 | 1.24 |
| 130 | blue | 9225 | 66.4 | 58.2 | 1.10 |
| 140 | green | 9235 | 51.5 | 60.0 | 0.90 |

It can be seen that the green-reflecting pearl gloss pigment was detrimental to the selective effect. The blue-reflecting pigment was slightly selective, but the desired value of T/g>1.15 was not achieved.

The sheet coated with red-reflecting pigment was fixed on its edges in a tensioning frame, heated in a circulating air heating cabinet to 160° C., and, by application of an air overpressure to the coated side, was curved to form a dome shape with a dome height of 100 mm. The maximum stretching was c. 50%. The coating produced a completely uniform effect in both the stretched and unstretched regions.

2. Coating of Different Plastics with a Coating, Using Paint Technology:

Similar plastic sheets comprised of bisphenol-A polycarbonate, polystyrene, and a styrene-acrylonitrile copolymer, were coated using the general method of Example 1. The coating layers obtained were 10–15 micron thick, with a red luster and IR-reflecting properties. They had good adhesion to the base material.

2. Coating of an Acrylic Glass Substitute with a Coating Dispersion:

A 3 mm thick sheet of acrylic glass substitute of size 300×300 mm was coated on one side with a coating dispersion as follows:

(i) 24 pbw (solids basis) of a 50% aqueous polyacrylate dispersion based on methyl methacrylate and butyl acrylate (trade name PLEXTOL® D 540, supplied by Roehm GmbH);

(ii) 16 pbw of a pearl gloss pigment comprised of mica particles of size 20–100 micron, coated with rutile titanium dioxide (trade name IRIODIN® 219, supplied by Merck);

(iii) 0.4 pbw of a fatty alcohol polyglycol ether, as a nonionic surfactant (trade name GENAPOL® XOPO, supplied by Hoechst A G);

(iv) 15 pbw of butyl diglycol acetate; and (v) 44.6 pbw water.

The coating film was applied to a thickness of 50 micron, with a roll coater. This brought about orientation of the pearl lustre pigment. The coating was dried and had thickness c. 10 micron. It contained 40 wt. % pigment (13 g/sq m). When illuminated it had a whitish appearance with a reddish luster. The light which it passed was a light green color. Its optical properties were (T)=57.9%, (g)=42%, T/g=1.38.

4. Coating of PMMA by Co-extrusion:

A co-extrudable coating composition was produced from:
(i) 75 pbw of a PMMA molding compound with melt flow index MFI (230° C./3.8)=25 g/min (trade name PLEXIGLAS® Formmasse 5N, supplied by Roehm GmbH); and
(ii) 25 pbw of red-reflecting pearl lustre pigment (trade name IRIODIN® 219, supplied by E. Merck).

In order to avoid breakage of the pigment platelets, a double-screw extruder with counter-rotating tightly mating screws was used, and the pigment was uniformly introduced directly into the melt and was thoroughly homogenized. The pigmented melt had MFI<1.4 g/min.

For the core layer of the co-extruded sheet, a PMMA molding compound with MFI (230° C./3.8)=1.4 g/min (trade name PLEXIGLAS® Formmasse 7H, supplied by Roehm GmbH) was used.

In a co-extrusion sheet adapter block according to Ger. Pat. 4,001,479, the melts of the two compositions were advanced at a thickness ratio of the coating and core layers of 1:150, and extrusion was carried out in a slit die attached thereto, to form a flat sheet. The core layer was 3 mm thick and the coating layer was 20 micron thick. The optical properties were (T)=61.7, (g)=47.4, and T/g=1.30.

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A durable, light-permeable infrared-reflecting body comprising an amorphous base material of light-permeable plastic and a coating layer of 5–40 μm thickness thereon which permanently adheres to the base material, said light-permeable infrared-reflecting body being transmissive to visible light and reflecting infrared light, and said coating layer comprising a transparent water-insoluble binder and infrared-reflecting particles in an amount of 20–40 wt. % based on said coating layer, said particles being oriented parallel to the surface of the base material, and wherein said infrared-reflecting particles comprise platelet-shaped carriers each having a 60–120 nm thick titanium dioxide layer thereon, said carriers each having a thickness of 200–2000 nm, and a diameter of 5–100 μm, and wherein the mean diameter of all the carriers is 20–70 μm, wherein the binder is comprised of a hydrophobic plastic material, and wherein the light-permeable plastic is a polymethyl methacrylate plastic, a polycarbonate plastic, a polystyrene, or a styrene-acrylonitrile copolymer.

2. The infrared-reflecting body according to claim 1, wherein the infrared-reflecting particles oriented parallel to the surface are comprised of coated platelet-shaped mineral materials having a thickness of 300–600 nm, a diameter of 20–60 micron, and a mean diameter of 20–25 micron.

3. The infrared-reflecting body according to claim 1 or 2, which has a reflection of at least 40% at 1000 nm.

4. The infrared-reflecting body according to claim 1, wherein the body has the shape of a flat sheet or plate.

5. The infrared-reflecting body according to claim 1, wherein the body has the shape of a double skin sheet or a light-admitting sky dome.

6. The infrared-reflecting body according to claim 1, wherein the body, including the coating layer, is stretched by at least 10%.

7. The durable, light-permeable infrared-reflecting body according to claim 1, wherein the coating layer has a thickness of 7–40 μm.

8. The durable, light-permeable infrared-reflecting body according to claim 7, wherein the coating layer has a thickness of 8–40 μm.

9. The durable, light-permeable infrared-reflecting body according to claim 8, wherein the coating layer has a thickness of 10–40 μm.

10. The durable, light-permeable infrared-reflecting body according to claim 9, wherein the coating layer has a thickness of 13–40 μm.

11. The durable, light-permeable infrared-reflecting body according to claim 10, wherein the coating layer has a thickness of 15–40 μm.

12. The durable, light-permeable infrared-reflecting body according to claim 11, wherein the coating layer has a thickness of 20–40 μm.

13. The durable, light-permeable infrared-reflecting body according to claim 1, which is obtained by coextruding said base material and said coating layer.

14. The durable, light-permeable infrared-reflecting body according to claim 1, wherein the light-permeable plastic is a polymethyl methacrylate plastic and the water-insoluble binder comprises a polymer or copolymer obtained from methyl methacrylate monomers.

15. The durable, light-permeable infrared-reflecting body according to claim 1, wherein the infrared-reflecting particles reflect red visible light.

* * * * *